United States Patent

[11] 3,566,098

[72] Inventor Makoto Kono
Tokyo, Japan
[21] Appl. No. 670,729
[22] Filed Sept. 26, 1967
[45] Patented Feb. 23, 1971
[73] Assignee Nippon Electric Company Limited
Tokyo, Japan
[32] Priority Sept. 28, 1966
[33] Japan
[31] 41/63887

[54] HIGH SPEED ADDER CIRCUIT
3 Claims, 15 Drawing Figs.

[52] U.S. Cl. .......... 235/175, 235/173, 235/168
[51] Int. Cl. .......... G06f 7/385, G06f 7/48, G06f 7/50
[50] Field of Search .......... 235/175, 174, 173, 168

[56] References Cited
UNITED STATES PATENTS
3,440,412 4/1969 Kardash .......... 235/175
OTHER REFERENCES
IBM Technical Disclosure Bulletin, " Three Input Binary Adder," A. R. Geller, VOL. 6 No. 6 Nov. 1963, Pages 46-48.
IBM Technical Disclosure Bulletin, " Group Carry Generator," M. S. Schmookler, Vol. 6 No. 1, June 1963, Pages 77—78.

*Primary Examiner*—Malcolm A. Morrison
*Assistant Examiner*—James F. Gottman
*Attorney*—Ostrolenk, Faber, Gerb & Soffen

ABSTRACT: A high-speed parallel adder circuit employing wired AND CML circuitry in which the digits corresponding to digit positions of the two multibit words are added to obtain an initial position sum and an initial position carry. Selected digit positions are divided into groups to develop group sum and group carry signals for each of said groups. The groups, in turn, are divided into super groups, and the group sum and carry signals, in turn, are employed to develop super group sum and super group carry signals. The super group sum and super group carry signals are, in turn, utilized to develop a real super group carry for each super group and to develop, indirectly, a real carry for each group. The real group carry signals, in turn, are employed for the development of a propagated carry signal for each digit position of each group which is developed by real group carry signals transferred to a selected digit position within each of said groups.

Simultaneously, therewith, the initial position sum and initial position carry signals of each digit position are employed for the purpose of developing a modified position sum signal within a group of digits of which the modified position sum signal is combined with the intergroup position carry signal which is propagated from the adjacent lower group to generate a signal representing the final position sum. Hereafter, all of the initial positions sum, group sum, supergroup sum, modified position sum, real group carry, real super group carry, intergroup position carry, final position sum or the like, may be abbreviated respectively as sum or carry signals when their meaning is clear in their related contex. The high-speed parallel adder circuit of the invention is capable of performing all of the above functions through the employment of circuitry which requires only seven logical levels.

INVENTOR.
MAKOTO KONO

BY

OSTROLENK, FABER, GERB & SOFFEN
ATTORNEYS

INVENTOR.
MAKOTO KONO
BY
OSTROLENK, FABER, GERB & SOFFEN
ATTORNEYS

INVENTOR.
MAKOTO KONO
BY
OSTROLENK, FABER, GERB & SOFFEN
ATTORNEYS

*INVENTOR.*
MAKOTO KONO

INVENTOR.
MAKOTO KONO

INVENTOR.
MAKOTO KONO

INVENTOR.
MAKOTO KONO

INVENTOR.
MAKOTO KONO

HIGH SPEED ADDER CIRCUIT

The instant invention relates to computers, and more particularly relates to high-speed parallel addition circuitry employing a modified Carry Look Ahead method which achieves a significant reduction in logical levels required through the unique application of Wire AND CML circuits.

In order to keep abreast with the recent developments in electronic computers, the need for a high-speed and high performance adder circuit is become indispensable.

A variety of methods have been proposed for use in designing high-speed adder circuits such as the Carry Look Ahead method, the Carry Select method, etc. The instant invention may be said to be related to the Carry Look Ahead method.

It is presently possible to simultaneously obtain a logical output signal and its complement through the use of current mode logic (CML) circuits. However, such circuits are presently capable of providing only a logical AND function (or a logical OR function when the relation between the signal levels in the binary states are reversed) and are, therefore, incapable of providing logical functions of AND-OR in a single level logic circuit.

In spite of the variety of proposed methods which have heretofore been evolved to date, there exists no suitable basic circuit which assures a simplicity in logical design. As a practical matter, there is no circuit configuration known to date which performs the logical function of AND-OR and which also simultaneously generates a logical function and its complement. In addition thereto, there is no circuit known to date which can perform the above function while employing a reduced number of circuit elements and which may operate at extremely high speeds.

Circuit elements of the well-known Diode Transistor Logic (DTL) type provide the logical functions of AND-OR-NOT and are only capable of generating a complementary output and not of generating both the true and complementary outputs simultaneously. When both the true signal and the complement thereof are required, the design of a logical circuit of the DTL type requires one additional stage of logical operation to provide both the true and the complementary signal. For this reason, logical circuits of the DTL type have the disadvantage of requiring long operational times and a large number of elements to produce the required logical functions.

Circuit elements of the Current Mode Logic (CML) type have been found to be capable of simultaneously generating true and complementary signals on a single logic level. However, the logical function that such CML circuits are capable of producing is only the AND function (or the OR function when the relationship between signal levels and binary states are reversed), and thus, the CML circuit is incapable of providing the additional characteristic of performing the logical AND-OR function on a single logic level.

As will be described subsequently herein, it has been found that it is possible to obtain the logical AND (or the logical OR function) through the wired connection of two or more such CML circuits. Thus, by connecting the NAND (i.e., the complement of AND) output terminals with one another, it has been found to be possible to achieve the logical function of NAND-AND in a single logic level, which logical function is equivalent to the above-described AND-OR-NOT in logical function (which it should be noted is capable of producing only the complementary output and is incapable of simultaneously producing the true output and its complement; with the employment of true outputs, only the AND-AND logical function may be obtained). Thus, the instant invention is characterized by providing a parallel-type high-speed adder circuit in which very high operating speeds are obtained through the ingenious employment of the highly advantageous features possessed by CML circuits when wired in a unique fashion. The instant invention thus provides a high-speed adder circuit of a simplicity and speed not heretofore possible while, at the same time, employing conventional CML circuits in a unique configuration.

In general, the most important consideration in the field of high-speed addition is the handling of Carries. In such systems, a Carry is developed which can be propagated to the next higher digit position by summing two inputs together with another Carry from the next lower digit position. This procedure is repeated for each digit position from the lowest to the highest, and normally requires a very long time between propagation of the Carry from the lowest digit position to the highest digit position.

Accordingly, in order to provide a high-speed addition, the following method may be employed:

The presence and absence of Carries for each digit position is initially determined. For example, these conditions in which a Carry is generated and in which no Carry is generated is initially obtained. Subsequent thereto, each initial sum obtained from the two inputs corresponding to a single digit position is then modified by a respective Carry in order to obtain an ultimate sum. This method commonly referred to as the Carry Look Ahead method is well-known. The instant invention is a modified Carry Look Ahead method which provides for very high speed addition through the ingenious application of highly advantageous features possessed by circuit elements such as the above-described CML circuits.

In the instant invention, the digit positions of the adder circuit are divided into appropriate groups and a sum and Carry signal is developed for each group. The Carries to be propagated to designated positions are classified into two categories—that Carry which is generated in a specific group to which that position belongs, and that Carry which is propagated to that position from a position outside of the group. The initial sum of each digit position is modified by using the Carry generated within the group associated with the initial sum, which results are obtained with relative ease. The modified sums are generated in both their true and complementary forms. Insofar as those Carries propagated from outside of a relevant group are concerned, both the true value and complementary value thereof are generated through skillful employment of the unique features of the CML circuits. The final sum is obtained by further modifying the already modified sum in accordance with the propagated Carry signals.

Since the true logical output and its complement are simultaneously obtained in a single-level logic circuit, and also since the logical function of NAND-AND is generated by directly connecting the CML circuits in a Wired AND fashion, the true and complemented logical outputs can thus be obtained simultaneously with the generation of a Carry to be propagated from outside of a relevant group, thereby enabling the number of logical levels in the parallel-type adder circuit to be significantly reduced, yielding greatly increased computational speeds. High reliability is also obtained due to the significant reduction in the number of components employed.

It is, therefore, one object of the instant invention to provide a novel high-speed parallel-type adder circuit employing the principles of a modified Carry Look Ahead technique.

Still another object of the instant invention is to provide a novel high-speed parallel-type adder circuit for use in computers, data processors, and the like, which advantageously utilizes CML circuitry in a unique manner to enable a significant reduction in logical levels of the adder circuit.

Yet another object of the instant invention is to provide a novel high-speed parallel-type adder circuit for use in computers, data processors, and the like, which employs CML circuitry in a novel Wired AND configuration which enables simultaneous generation of Carries within groups of digits and propagated Carries to be simultaneously generated for the purpose of respectively modifying and further modifying the sum at each digit position to generate the final sum.

Still another object of the instant invention is to provide a novel high-speed parallel-type adder circuit for use in computers, data processors, and the like, in which first means (half-adder Circuits) are provided for forming an initial position sum and an initial position Carry for corresponding inputs of each digit position; wherein the digit positions are divided into appropriate groups, and seconds means are provided for generating a group sum and a group Carry for each group; wherein the groups are divided into appropriate supergroups, and third means are provided for generating a supergroup sum and a supergroup Carry for each supergroup; fourth means for generating a real supergroup Carry signals from the supergroup Carry signal; fifth means for generating real group Carry signals; sixth means for generating intergroup position Carry signals from the real group Carry signals and the initial position sum signals; seventh means for generating intragroup Carry signals within each group from the initial position sum and initial position Carry signals; eighth means for generating modified position sum signals from the initial position sum and intragroup Carry signals; and the ninth means for generating final position sum signals from the modified position sum signals and the intergroup position Carry signals that are propagated from adjacent lower digit position group.

Yet another object of the instant invention is to provide a novel logical circuitry configuration capable of generating logical NAND-AND or logical NOR-OR functions while, at the same time simultaneously generating the true logical signal and its complementary output, which circuitry may be advantageously employed in a variety of circuit and/or system applications such as, for example, high-speed parallel-type adder circuits.

These and other objects of the instant invention will become apparent when reading the accompanying description and drawings in which:

FIG. 1*a* is a schematic diagram showing one current mode logic (CML) circuit.

FIGS. 1*b* and 1*c* are logic diagrams which indicate the relationship between logical inputs and outputs of the circuit element shown in FIG. 1*a*.

Figure 1A:
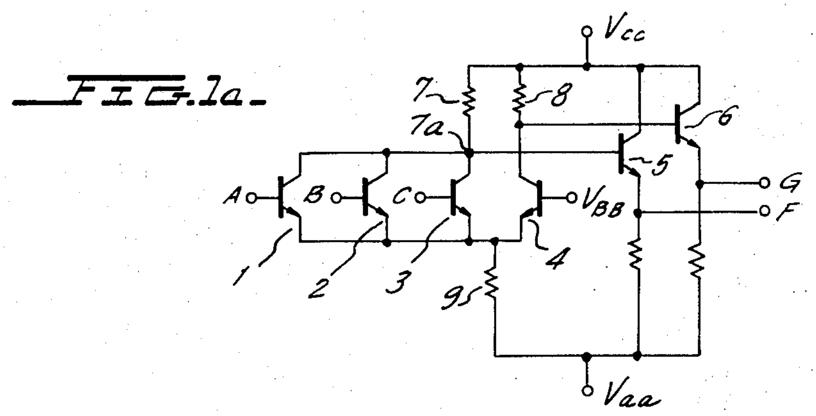

Referring now to the drawings, FIG. 1*a* shows a schematic circuit configuration commonly referred to as a CML (current mode logic) circuit which may be employed to great advantage in the instant invention. Principles of operation of this circuit are briefly as follows:

Transistors 1 through 4 have their emitters connected in common to one terminal of resistor 9. Transistors 1 through 3 have their collectors connected in common to one terminal of resistor 7 whose common connection is coupled to the base of a transistor 5. The collector of transistor 4 is coupled through resistor 8 to a positive voltage source $V_{CC}$. The collector of transistor 4 is coupled to the base of transistor 6. The circuit outputs are taken from the emitters of transistors 5 and 6 and appear at the output terminals F and G, respectively.

The constant voltage $V_{BB}$ is coupled to the base electrode of transistor 4. When one or more of the input terminals A through C of transistors 1 through 3, respectively, have applied thereto a voltage more positive than the voltage $V_{BB}$, then the current flowing through resistor 9 is routed through those transistors 1 through 3 which have a voltage applied to their terminals greater than $V_{BB}$, causing a voltage drop to develop across collector-resistor 7.

This voltage is applied to the base electrode of output transistor 5 which is connected in emitter-follower fashion with its output taken from its emitter electrode and appearing at output terminal F.

Since the voltage at the base of at least one of transistors 1 through 3 is greater than the voltage at the base of transistor 4 (i.e., greater than $V_{BB}$), no current flows through transistor 4 so that no voltage drop will be developed across collector-resistor 8, causing a voltage almost equal to power source voltage $V_{CC}$ to be applied to the base electrode of transistor 6 which is also connected in emitter-follower fashion, and has its emitter electrode coupled to output terminal G. At such time, the potential at terminal G is of a higher level than the potential at terminal F.

In the case where the voltage levels appearing at terminals *A*, *B* and *C* are lower than the reference voltage level $V_{BB}$ applied to the base electrode of transistor 4, then the current flowing in the emitter resistance 9 is diverted through transistor 4 so as to develop a voltage drop across collector-resistor 8. Since none of the current flowing in the emitter-resistance 9 is diverted through transistors 1 through 3, no voltage drop is developed across resistor 7 so that the voltage at its lower terminal 7*a* is nearly equal to the supply voltage $V_{CC}$. Thus, the voltage levels at output terminals F and G which are derived from output transistors 5 and 6, respectively, will be opposite in state relative to the previous case such that the level at output terminal F is now at a higher potential than the level at terminal G.

As is obvious from the circuit operations described above, it can be seen that if the higher potential is made to correspond to a logical signal 1 and the lower potential to a logical signal 0, then the CML circuit of FIG. 1*a* provides the logical functions of OR and NOR (i.e., the negation of OR). Reversing the relationship between voltage levels and logical signal designations, if the lower potential is made to correspond to the logical signal 1 and the higher potential corresponds to the logical signal 0, then the CML provides the logical functions of AND and NAND (which is the negation of AND).

Figure 1B:
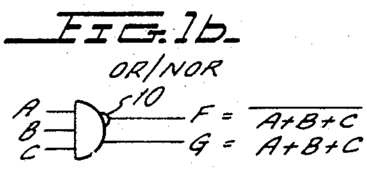
Figure 1C:
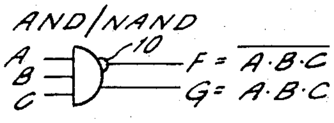

FIGS. 1*b* and 1*c* are logic diagrams showing the state of the logical outputs for the former and latter cases, respectively, which have been described above. Both FIGS. 1*b* and 1*c* indicate, in Boolean algebra expressions, the outputs of the circuit of FIG. 1*a*, but differ in the respect that the voltage levels selected to represent the binary 1 and 0 signals are in opposite states relative to one another. The small semicircles 10 shown in FIGS. 1*b* and 1*c* indicate negation, namely the NOR function in the case of the OR logic circuit, and the NAND in the case of the logical AND function.

It should be clearly understood from the above explanation that the logical function of the CML circuit be it AND and NAND or OR and NOR is dependent simply upon the selection of the potential levels as binary 1 and binary 0 or binary 0 and binary 1, respectively, and that the logical functions performed by the circuit has absolutely nothing to do with the circuitry configuration.

Whereas the logical function of the CML circuit will be assumed to perform AND and NAND logical functions in the succeeding explanations, it should also be understood that the ensuing explanations can be applied with equal success, and the circuitry may be employed to perform OR and NOR functions simply by reversing the definition of the logical signals.

Another very important feature which can be realized from the circuit of FIG. 1*a* is the capability of being able to provide an additional AND function by directly connecting the output terminals of two circuits of the type shown in FIG. 1*a* to one another. The AND function results from the fact that the outputs F and G are derived through the use of an emitter-follower method so as to yield the desirable AND function. Two such circuits of the type shown in FIG. 1*a* wired in the abovementioned fashion will hereinafter be referred to as a Wired AND.

Figure 2:
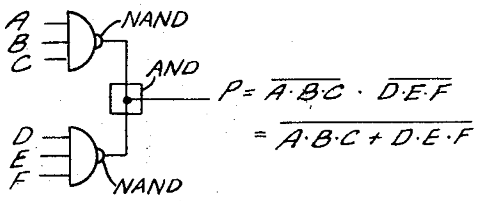
FIG. 2 is a symbolic logic diagram, together with the Boolean algebra equations representing a "Wired AND" circuit which may employ the current mode logic circuitry of FIG. 1*a*.

If such a Wired AND circuit is provided by connecting the NAND outputs with one another as shown in symbolic fashion in FIG. 2, the logical function of this single-level CML circuit is NANDsAND. This logical function, as can be seen from equation (1) set forth below, is identically equal to that of the above-described AND-OR-NOT function.

$$P=\overline{\overline{\overline{(A\cdot B\cdot C)}\cdot\overline{(D\cdot E\cdot F)}}}$$

$$=\overline{\overline{\overline{(A\cdot B\cdot C)}\cdot\overline{(D\cdot E\cdot F)}}} \quad (1)$$

Whereas the signal obtained by means of the Wired AND circuit of FIG. 2 is merely the logical output NAND-AND, it should be noted that the complementary output thereof, namely, NAND-NAND (viz AND-OR) is not available. Thus, even if the AND's are connected to one another, only the AND-AND logical function can be obtained and not the AND-OR logical function.

Although FIGS. 1$a$ through 1$c$ and 2 illustrate logical circuits having three inputs, it should be understood that the above explanation has been presented for purposes of simplicity and that a circuit including an arbitrary number of inputs can be designed in principle by changing the number of input transistors (1 through 3 in the circuit of FIG. 1$a$) to a greater or lesser number, if desired.

It is further possible to apply the Wired AND circuit to an arbitrary number of outputs whose total number of outputs, however, are as a practical matter limited due to the FAN OUT characteristics exhibited by the circuit of FIG. 1$a$.

Figure 3:
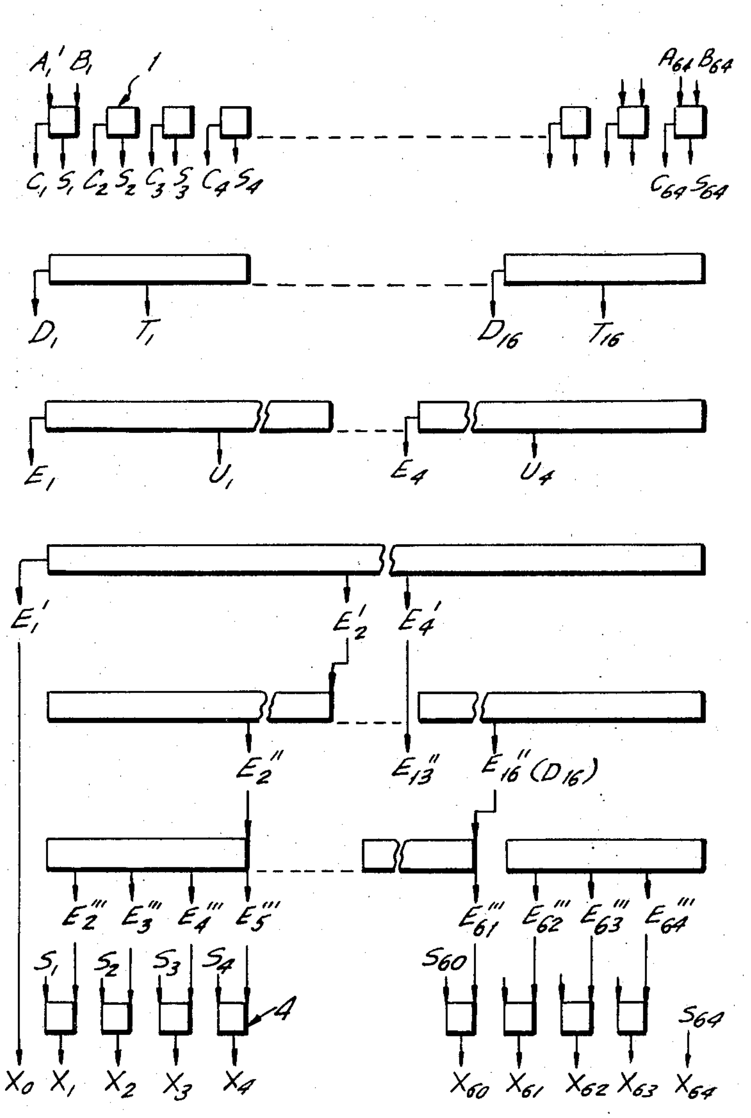
FIG. 3 is a block diagram of a conventional adder circuit which employs the principles of the Carry Look Ahead method employed in the prior art.

FIG. 3 illustrates the principle of an adder circuit which performs the addition of two 64-bit words employing the conventional Carry Look Ahead method. The principle of the conventional Carry Look Ahead will now be explained for the purpose of better understanding of the instant invention:

Initially, two inputs $A_i$ and $B_i$ (where $i$ = 1,2,3, ...., 63, 64) are summed up with the use of a half adder circuit 1, and then its sum $S_i$ and its Carry $C_i$ are obtained at the output terminals thereof as shown in the FIG.

The next step is to divide all of the summed digits into proper groups. For example, as shown in FIG. 3, the 64-digit positions are divided into 16 groups, each consisting of 4 digits, For each group, a Carry $D_j$ (where $j$ equals 1,2,3, ... 15,16) is developed for transfer into the next higher order group. A sum $T_j$ is also developed for each group. In this case, the sum, being a Carry transfer condition, is characterized as being a signal which identifies whether a Carry into the next higher order group is generated or not when another Carry into the relevant group is propagated.

Thus, if a Carry from a lower order group is transferred into the next higher order group and if that next higher order group develops a sum signal, this results in a Carry signal being transferred to still the next higher order group.

The next step consists of arranging of 16 groups developing the outputs $D_1$ and $T_1$ through $D_{16}$ and $T_{16}$ into supergroups, each consisting of 4 groups developing the $D$ and $T$ outputs. A Carry $E_l$ (where $l$ = 1,2,3,4) and a sum $U_l$ are developed in a similar fashion for the 4 supergroups.

The supergroup Carries $E_l$ and sums $U_l$ are then employed to develop a real Carry $E'_l$ for each of the supergroups. The real Carries $E'_l$ are then employed to develop a real Carry $E''_j$ for each group (the groups being those circuits developing the outputs $D$ and $T$). Still further, the real Carries $E'_i$ are employed to develop a real Carry $E'''_i$ for each place or position (there being 64 positions for each of the 64 digits). Ultimately, a sum is developed employing the initial sums $S_i$ which have been previously obtained by summing with the real Carriers $E'''+_1$ to ultimately develop the final sum $X_i$ (where $i = 1 - 64$). The Boolean algebra expressions for the logical signal developed are as follows:

$$S_i = A_i\cdot\overline{B_i} + \overline{A_i}\cdot B_i$$

$$C_i = A_i\cdot B_i;\ \mathrm{i} = 1-64 \quad (2)$$

$$D_j = C_k + S_k\cdot C_k+1 + S_k\cdot S_k+1\cdot C_k+2 + S_k\cdot S_k+_1\cdot S_k+_2\cdot C_k+3 \quad (3)$$

$$T_j = S_k\cdot S_k+_1\cdot S_k+_2\cdot S_k+_3\cdot;\ j=\mathbf{1-16}$$

$$k=1+4(j-1)$$

$$E_l = D_m + T_m\cdot D_m+_1 + T_m\cdot T_m+_1\cdot D_m+_2 + T_m\cdot T_m+_1\cdot T_m+_2\cdot D_m+_3$$

$$U_l = T_m\cdot T_m+_1\cdot T_m+_2⅓_m+_3;\ \mathrm{l}=\mathbf{1-4}$$

$$m=1+4(l-1) \quad (4)$$

$$E'_1 = E_1 + U_1\cdot E_2 + U_1\cdot U_2\cdot E \text{ z } U_1\cdot U_2\cdot U.E_4$$

$$E'_2 = E_2 + U_2\cdot E_3 + U_2\cdot U_3\cdot E$$

$$E'_3 = E_3 + U_3\cdot E_4$$

$$E'_4 = E_4 \quad (5)$$

$$E''_{4(\mathrm{n}-1)+1} = E'_{\mathrm{n}}$$

$$E''_{4(\mathrm{n}-1)+2} = D_{4(\mathrm{n}-1)+2} + T_{4(\mathrm{n}-1)+2}\cdot D_{4(\mathrm{n}-1)+3} + T_{4(\mathrm{n}-1)+2}\cdot T_{4(\mathrm{n}-1)+3}\cdot D_{4(\mathrm{n}-1)+4} + T_{4(\mathrm{n}-1)+2}\cdot T_{4(\mathrm{n}-1)+3}\cdot T_{4(\mathrm{n}-1)+4}\cdot E'_{\mathrm{n}+1}$$

$$E''_{4(\mathrm{n}-1)+3} = D_{4(\mathrm{n}-1)+3} + T_{4(\mathrm{n}-1)+3}\cdot D_{4(\mathrm{n}-1)+4} + T_{4(\mathrm{n}-1)+3}\cdot T_{4(\mathrm{n}-1)+4}\cdot E'_{\mathrm{n}+1}$$

$$E''_{4(\mathrm{n}-1)+4} = D_{4(\mathrm{n}-1)+4} + T_{4(\mathrm{a}-1)+4}\cdot E'_{\mathrm{n}+1};\ \mathrm{n}=1-4$$

$$\text{provided } E'_5=0 \quad (6)$$

$$E'''_{4(\mathrm{p}-1)+1} = E''_{\mathrm{p}}$$

$$E'''_{4(\mathrm{p}-1)+2} = C_{4(\mathrm{p}-1)+2} + S_{4(\mathrm{p}-1)+2}\cdot C_{4(\mathrm{p}-1)+3} + S_{4(\mathrm{p}-1)+2}\cdot S_{4(\mathrm{p}-1)+3}\cdot C_{4(\mathrm{p}-1)+4} + S_{4(\mathrm{p}-1)+2}\cdot S_{4(\mathrm{p}-1)+3}\cdot S_{4(\mathrm{p}-1)+4}\cdot E''_{\mathrm{p}+1}$$

$$E'''_{4(\mathrm{p}-1)+3} = C_{4(\mathrm{p}-1)+3} + S_{4(\mathrm{p}-1)+3}\cdot C_{4(\mathrm{p}-1)+4} + S_{4(\mathrm{p}-1)+3}\cdot S_{4(\mathrm{p}-1)+4}\cdot E''_{\mathrm{p}+1}$$

$$E'''_{4(\mathrm{p}-1)+4} = C_{4(\mathrm{p}-1)+4} + S_{4(\mathrm{p}-1)+4}\cdot E''_{\mathrm{p}+1}$$

$$p=1-16$$

$$\text{provided } E''_{17}=0 \quad (7)$$

$$X_o = E'''_1$$

$$X_{\mathrm{i}} = S_1\cdot\overline{E'''_{\mathrm{i}+1}} + \overline{S_1}\cdot E'''_{\mathrm{i}+1} \quad i=1-64$$

$$\text{provided } E_{65}=0 \quad (8)$$

Equations (2) through (8) set forth above represent the logical functions to be performed wherein the sum is represented in its standard form as shown in Equation (1), for example. Assuming there exists a circuit element which provides an AND-OR function within a single circuit level, then the number of logical levels of the adder circuit will be 7, as is obvious from FIG. 3. However, as a practical matter, no suitable elements exist which provide the function of AND-OR within a single-level and simultaneously therewith make their complements available. Thus, if the single-level AND-OR is assumed to serialized with a two-level NAND, then the number of logical levels of the adder circuit shown in FIG. 3 that will be required will be 14.

In the case of a parallel-type adder circuit, the operational time is proportional to the number of logical levels so far as identical elements are used. Thus, in order to achieve high-speed addition, it is required that the number of logical levels be reduced as much as possible.

Figure 4:
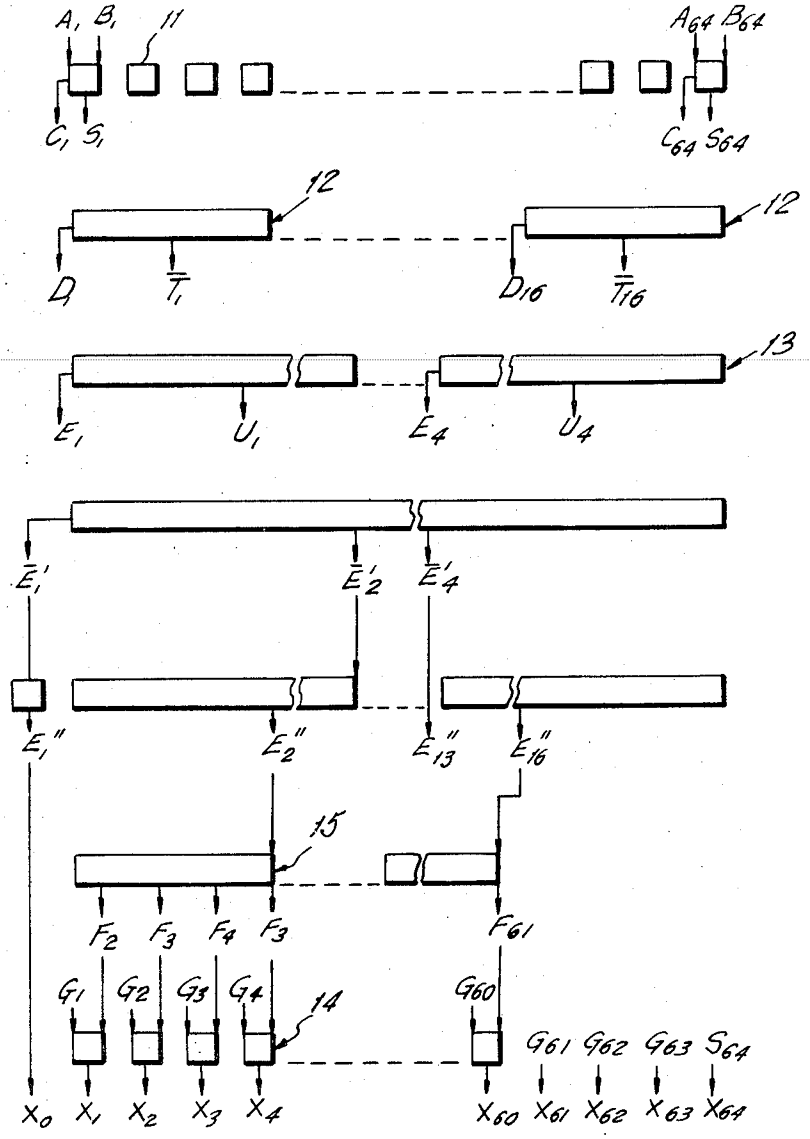
FIG. 4 is a block diagram showing a 64-bit adder circuit designed in accordance with the principles of the instant invention.

FIG. 4 illustrates one preferred embodiment incorporating the principles of the instant invention into a parallel-type adder circuit capable of adding two 64-digit words, and an explanation of the circuit and its operation is set forth below.

Initially, each sum $S_i$ of two corresponding inputs $A_i$ and $B_i$ and its Carry $C_i$ will be obtained with a half adder circuit 11. To provide this function the Wired AND circuit shown in FIG. 2 may be employed in order to reduce the number of logical levels.

As was previously described, the Wired AND circuit yields only the logical output of NAND-AND and not its complement. Hence, if a true signal of the sum (viz the logical output of EXCLUSIVE OR) is required, then the negation of EXCLUSIVE OR, that is, the logic of COINCIDENCE is applied to the input side of the NAND gate, as is evident from the following equation (9):

$$S_{\mathrm{i}} = \overline{\overline{A}_{\mathrm{i}}\cdot B_{\mathrm{i}} + A_{\mathrm{i}}\cdot\overline{B}_{\mathrm{i}}}$$

$$= (A_{\mathrm{i}}\cdot B_{\mathrm{i}} + \overline{A}_{\mathrm{i}}\cdot\overline{B}_{\mathrm{i}})$$

$$C_{\mathrm{i}} = A_{\mathrm{i}}\cdot B_{\mathrm{i}} \quad (9)$$

Figure 5:
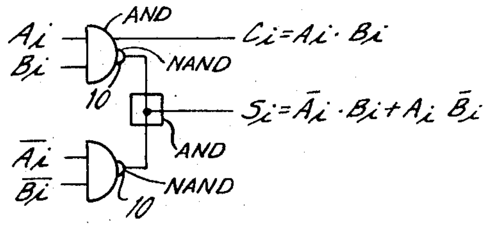
FIG. 5 is a logical block diagram showing a half-adder circuit based on the Wired AND circuitry shown in FIG. 2.

The circuitry of a half adder using the Wired AND configuration is shown in FIG. 5. As can be seen from the configuration shown therein, the Wired AND negation outputs 10–10 yield the desired sum output signal $S_i$. The use of the Wired AND circuit shown in FIG. 5 permits the half addition operation to be performed with one-level logic.

As can be seen from FIG. 5, the complementary signals $A_i$ and $B_i$ must be provided as inputs in addition to the two true signals $A_i$ and $B_i$, respectively.

The illustration of the functional blocks shown in FIG. 5, however, indicate the complemented input signals have been omitted from FIG. 4 showing the half adder circuits 11 for purposes of simplicity only.

Through ingenious application of the Wired AND circuits, the above-described equations (3) through (6) may be respectively transformed into the following equations (10) through (13):

$$\overline{D_j}=\overline{C_k}\cdot\overline{S_k\cdot C_{+1}}\cdot\overline{S_k\cdot S_{k+1}\cdot C_{k+2}}\cdot\overline{S_k\cdot S_{k+1}\cdot S_{k+2}\cdot C_{k+3}}$$

$$T_j=S_k\cdot S_{k+1}\cdot S_{k+2}\cdot S_{k+3}\ ;\ j=\mathbf{1-16}$$

$$k=1+4(j-1) \qquad (10)$$

$$El=\overline{\overline{\overline{D_m}\cdot\overline{T_m\cdot D_{m+1}}\cdot\overline{T_m\cdot T_{m+1}\cdot D_{m+2}}\cdot\overline{T_m\cdot T_{m+1}\cdot T_{m+2}\cdot D_{m+3}}}}$$

$$=\overline{\overline{\overline{D_m}}\cdot\overline{T_m}}\cdot\overline{\overline{\overline{D_m}}\cdot\overline{D_{m+1}}\cdot\overline{T_{m+1}}}\cdot\overline{\overline{\overline{D_m}}\cdot\overline{D_{m+1}}\cdot\overline{D_{m+2}}\cdot\overline{T_{m+2}}}$$

$$\cdot\overline{\overline{\overline{D_m}}\cdot\overline{D_{m+1}}\cdot\overline{D_{m+2}}\cdot\overline{D_{m+3}}} \qquad (11)$$

$$U_l=T_m\cdot T_{m+1}\cdot T_{m+2}\cdot T_{m+3};\qquad l=\mathbf{1-4}$$

$$n=1+4(l-1)$$

$$E_1'=E_1\cdot U_1\cdot E_2\cdot U_1\cdot U_2\cdot E\ .\ U_1\cdot U_2\cdot U.E_4$$

$$E_2'=E_2\cdot U_2\cdot E_3\cdot U_2\cdot U_3\cdot E_4$$

$$E_3'=E_3\cdot U_3\cdot E_4$$

$$E_4'=E_4 \qquad (12)$$

$$E''_{4(n-1)+1}=\overline{\overline{E'_n}}$$

$$E''_{4(n-1)+2}=\overline{\overline{D_{4(n-1)+2}}\cdot\overline{T_{4(n-1)+2}}}\cdot\overline{\overline{D_{4(n-1)+2}}\cdot\overline{D_{4(n-1)+3}}\cdot\overline{T_{4(n-1)+3}}}$$

$$\cdot\overline{\overline{D_{4(n-1)+2}}\cdot\overline{D_{4(n-1)+3}}\cdot\overline{D_{4(n-1)+4}}\cdot\overline{T_{4(n-1)+4}}}$$

$$\cdot\overline{\overline{D_{4(n-1)+2}}\cdot\overline{D_{4(n-1)+3}}\cdot\overline{D_{4(n-1)+4}}\cdot\overline{E'_{n+1}}}$$

$$E''_{4(n-1)+3}=\overline{\overline{D_{4(n-1)+3}}\cdot\overline{T_{4(n-1)+3}}}\cdot\overline{\overline{D_{4(n-1)+3}}\cdot\overline{D_{4(n-1)+4}}\cdot\overline{T_{4(n-1)+4}}}$$

$$\cdot\overline{\overline{D_{4(n-1)+3}}\cdot\overline{D_{4(n-1)+4}}\cdot\overline{E'_{n+1}}}$$

$$E''_{4(n-1)+4}=\overline{\overline{D_{4(n-1)+4}}\cdot\overline{T_{4(n-1)+4}}}\cdot\overline{\overline{D_{4(n-1)+4}}\cdot\overline{E'_{n+1}}}$$

$$n=1\text{–}4 \qquad (13)$$

As is apparent from equations (10) through (13), since the expressions are in the form of NAND-AND, the Carries $E''_{4(n-1)+1}-E''_{4(n-1)+4}$ (where $n=\mathbf{1}-\mathbf{4}$) may readily be obtained as a result of the efficient use of the Wired AND circuit for the groups (each consisting of 4 digits) designated by the numeral 12 and the supergroups designated by the numeral 13 and the succeeding similar logic blocks generating $E_1'$ $E_4'$ in FIG. 4. From a study of the equations, I have learned that a Carry into a particular position $i$ may be classified into one of two categories: $Q_{i+1}$ for a Carry which is generated within that group; and $F_{i+1}$ for a Carry that is propagated from an adjacent group into that group. I have further noted that the terms $Q_{i+1}$ and $F_{i+1}$ are never at the binary 1 level at the same time as a result of the inherent characteristics of the Carries.

Figure 6:
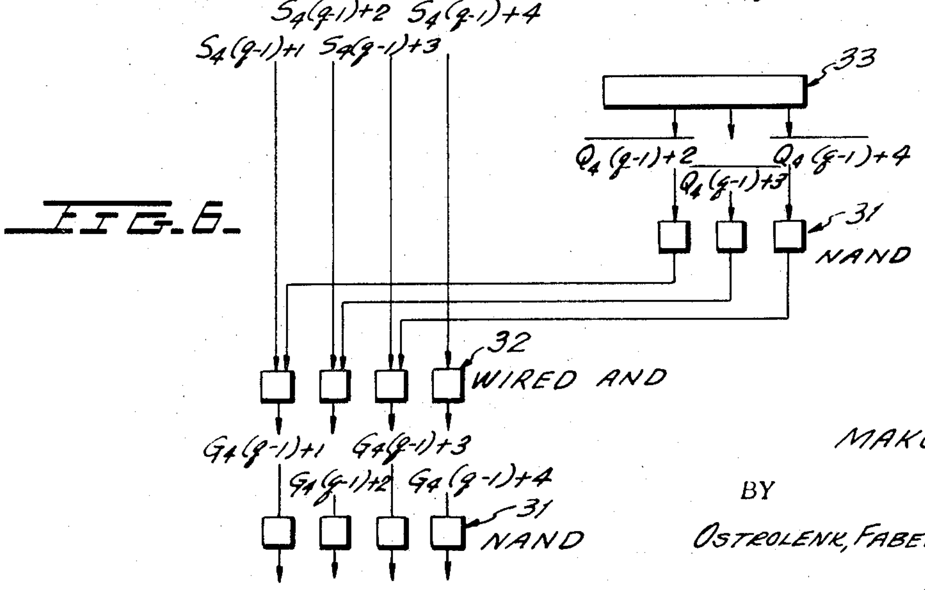
FIG. 6 is a block diagram showing the arrangement employed for obtaining a modified position sum within a group of digits employing the methods of the instant invention.

Since the former term can be obtained with relatively simple logic, it becomes possible to develop the former signal (i.e., $Q_{i+1}$) in parallel with $F_{i+1}$ in order to be able to obtain in advance a modified sum $G_i$ through the application of an EXCLUSIVE OR function to the $Q_{i+1}$ and the initial sum $S_i$. FIG. 6 shows a circuit configuration which may be employed for obtaining the modified sum $G_i$ and equations (14) and (15) set forth below indicate the relationship among the logical signals.

$$\overline{Q_{4(q-1)+2}}=\overline{C_{4(q-1)+2}}\cdot\overline{S_{4(q-1)+2}\cdot C_{4(q-1)+3}}$$

$$\cdot\overline{S_{4(q-1)+2}\cdot S_{4(q-1)+3}\cdot C_{4(q-1)+4}}$$

$$\overline{Q_{4(q-1)+3}}=\overline{C_{4(q-1)+3}}\cdot\overline{S_{4(q-1)+3}\cdot C_{4(q-1)+4}}$$

$$Q_{4(q-1)+4}=\overline{C_{4(q-1)+4}};\ q=1\text{–}16 \qquad (14)$$

$$G_{4(q-1)+1}=\overline{S_{4(q-1)+1}\cdot Q_{4(q-1)+2}}\cdot\overline{\overline{S_{4(q-1)+1}}\cdot\overline{Q_{4(q-1)+2}}}$$

$$G_{4(q-1)+2}=\overline{S_{4(q-1)+2}\cdot Q_{4(q-1)+3}}\cdot\overline{\overline{S_{4(q-1)+2}}\cdot\overline{Q_{4(q-1)+3}}}$$

$$G_{4(q-1)+3}=\overline{S_{4(q-1)+3}\cdot Q_{4(q-1)+4}}\cdot\overline{\overline{S_{4(q-1)+3}}\cdot\overline{Q_{4(q-1)+4}}}$$

$$G_{4(q-1)+4}=S_{4(q-1)+4};\ q=1\text{–}16 \qquad (15)$$

In FIG. 6, the logic blocks designated by the numeral 31 represent NAND circuits provided for complementation operations; the logical blocks 32 represent half adders constructed of Wired AND circuits; and logic blocks 33 represent circuitry for obtaining a Carry within a group. In the embodiment of FIG. 6, the group is defined as one which is comprised of four digits. Since the input of half-adder 32 must be supplied with the complement $S$ of signal $S$, and NAND circuit is required in order to obtain the complement $S$ of a signal $S$. This NAND circuit has been omitted from FIG. 6 since there is no need for calculating the number of logical levels in order to obtain an understanding of the circuitry and operation of this FIG.

As is apparent from FIG. 6, the number of logical levels which is required to develop both the true and complementary value of the modified sum $G_i$ is, after the application of the two inputs $A_i$ and $B_i$ (inclusive of $A_i$ and $B_i$), one level for obtaining $C_i$ and $S_i$, two levels for obtaining $Q_i$ and $Q_i$, and finally, two levels for obtaining $G_i$ and $G_i$, yielding a total of five levels.

On the other hand, the logical equations for obtaining each $F_i$ signal (i.e., the Carry into a group from an adjacent group) for the purpose of remodifying the modified position sum $G_i$ are set forth in equation (16) as follows:

$$F_{4(r-2)+2}=S_{4(r-2)+2}\cdot S_{4(r-2)+3}\cdot S_{4(r-2)+4}\cdot E''_r$$

$$F_{4(r-2)+3}=S_{4(r-2)+3}\cdot S_{4(r-2)+4}\cdot E''_r$$

$$F_{4(r-2)+4}=S_{4(r-2)+4}\cdot E''_r$$

$$F_{4(r-2)+5}=E''_r \qquad r=\mathbf{2,3,4,....,15,16}$$

$$E_{17}''=0 \qquad (16)$$

As can clearly be seen from equation (16), the $F_i$ signals may be expeditiously obtained due to the use of only the logical AND function. Thus, by means of the circuit 15 shown in FIG. 4, both the true and the complementary states of the Carry signal $F_i$ transferred into a group from an outside group can be obtained through the use of a one-level logic circuit. The total number of logical levels, therefor, is 6, as is obvious from FIGS. 4 and 6.

On the other hand, since the number of logical levels necessary for obtaining both the true and complementary signal of $G_i$ is 5, then the value of $G_i$ will have already been obtained prior to the time that the signal $F_i$ is obtained, since the latter requires six logical levels. Thus, through the use of half adder 14 shown in FIG. 4 which is comprised of a Wired AND circuit configuration, the final sum $X_i$ is obtained, as indicated by equation (17) through the application of an EXCLUSIVE OR operation to the $F_i$ and $G_i$ signals.

$$X_o=E''_1$$

$$X_i=G_i\cdot\overline{F_{i+1}}+\overline{G_i}\cdot F_{i+1};\quad i=1\text{–}64 \qquad (17)$$

Figure 7:
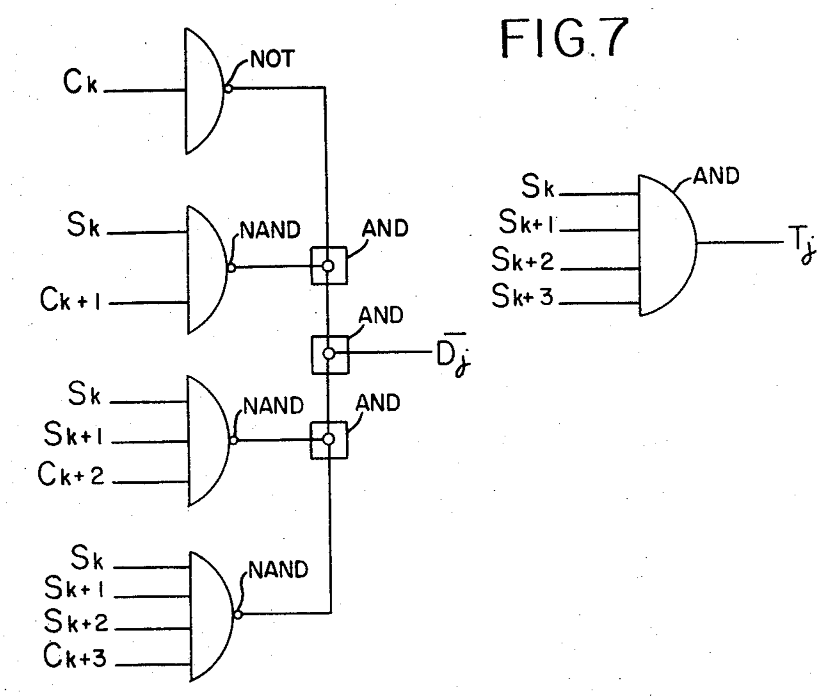
FIGS. 7 through 13 are logic circuit diagrams which represent the logical operations called for in equations (1) through (17) respectively set forth hereinbelow.
Figure 8:
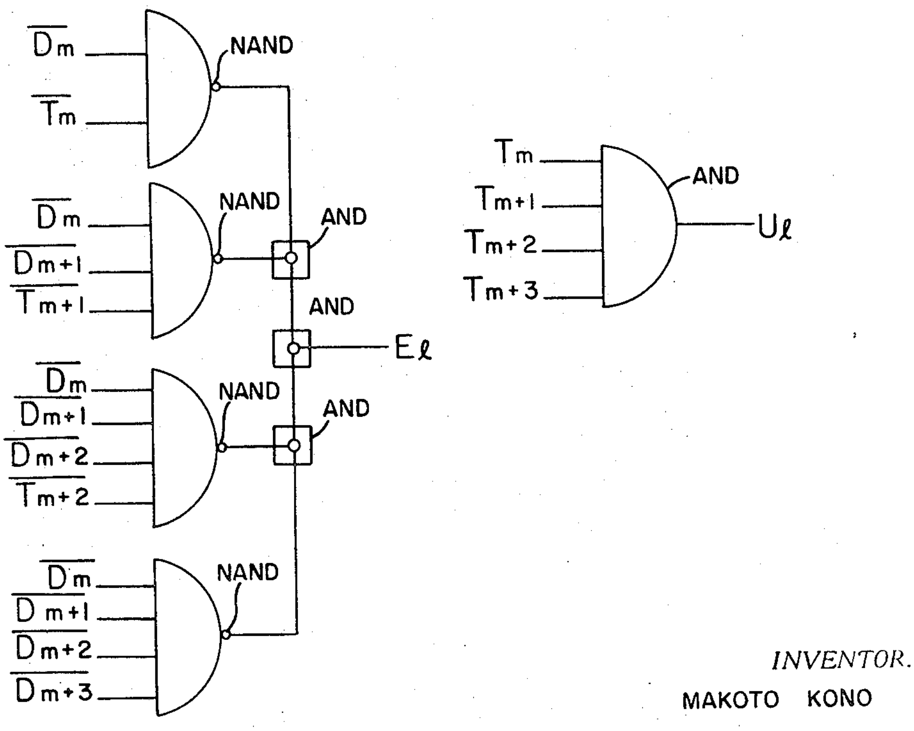
Figure 9:
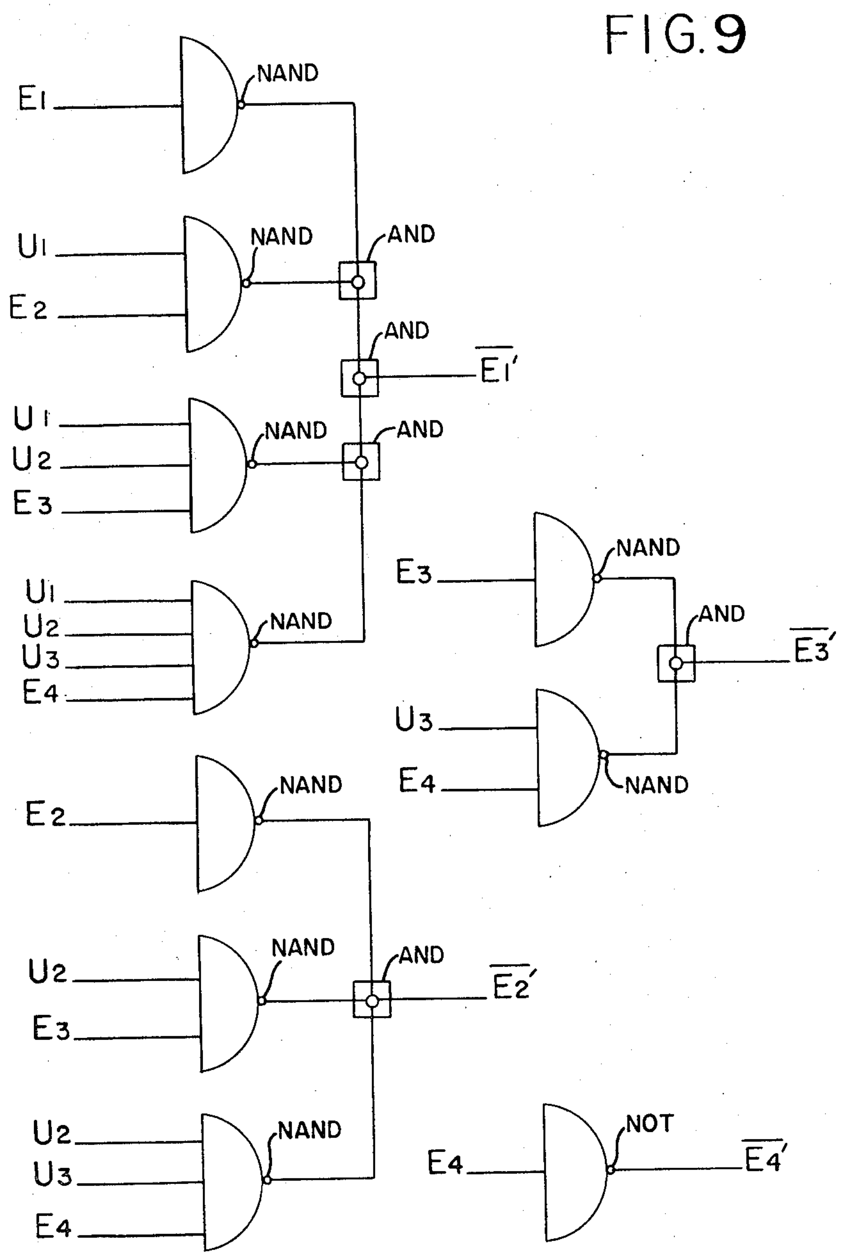
Figure 10:
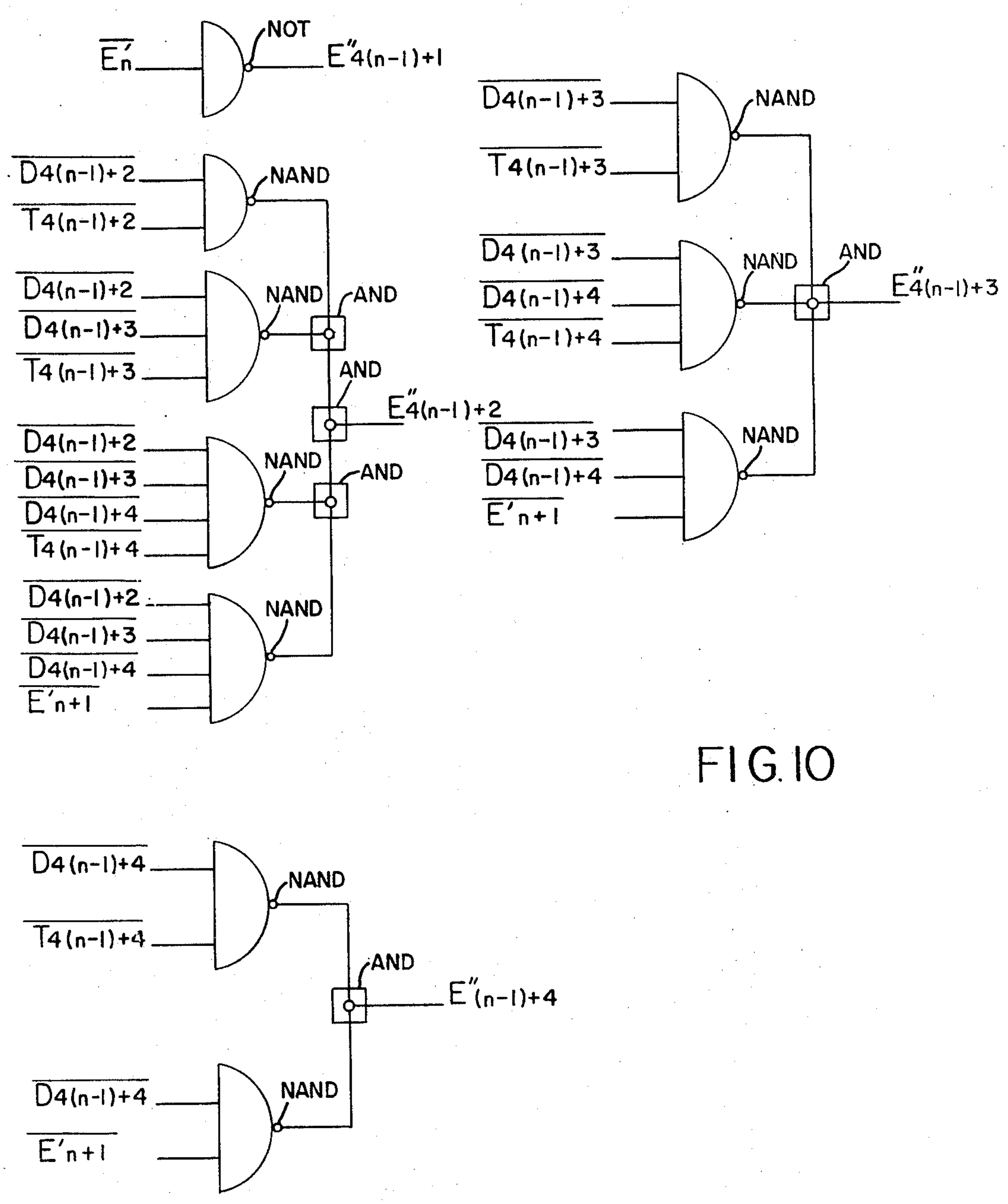
Figure 11:
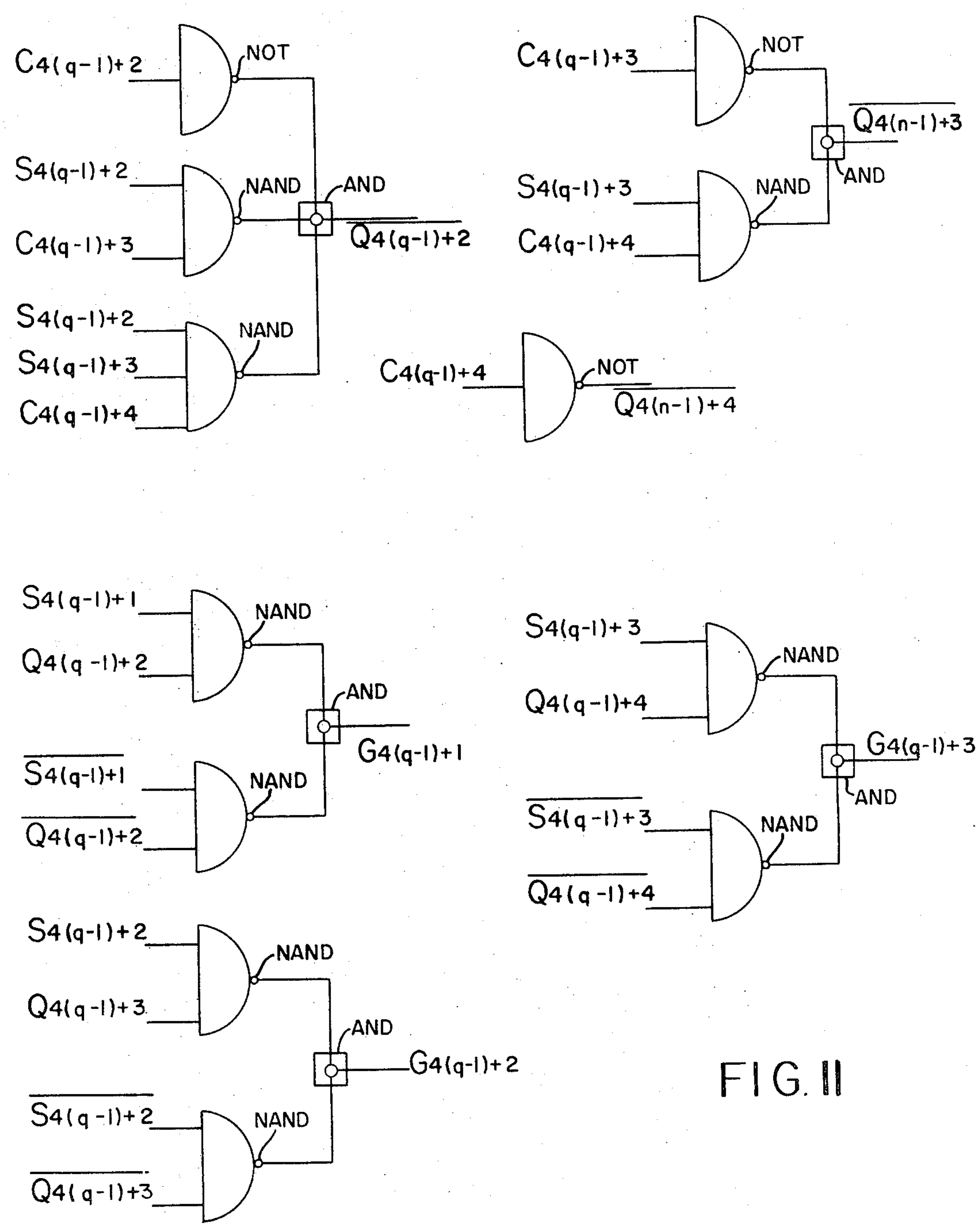
Figure 12:
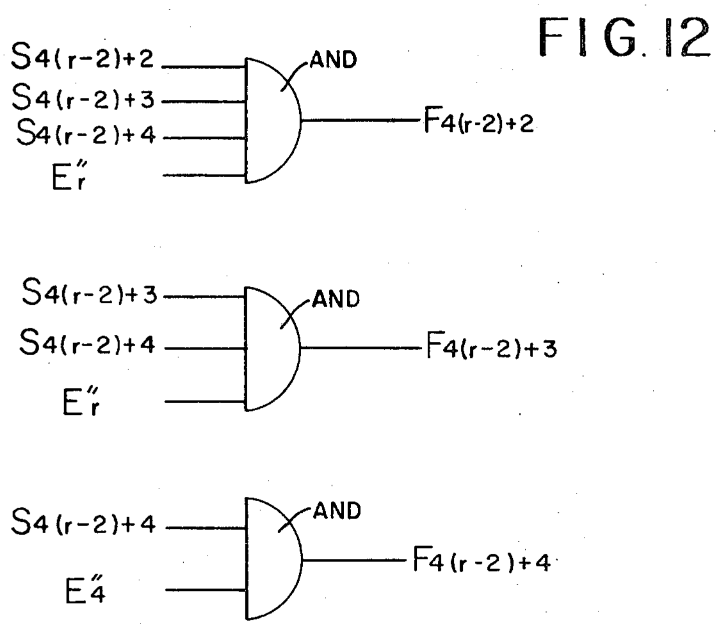
Figure 13:
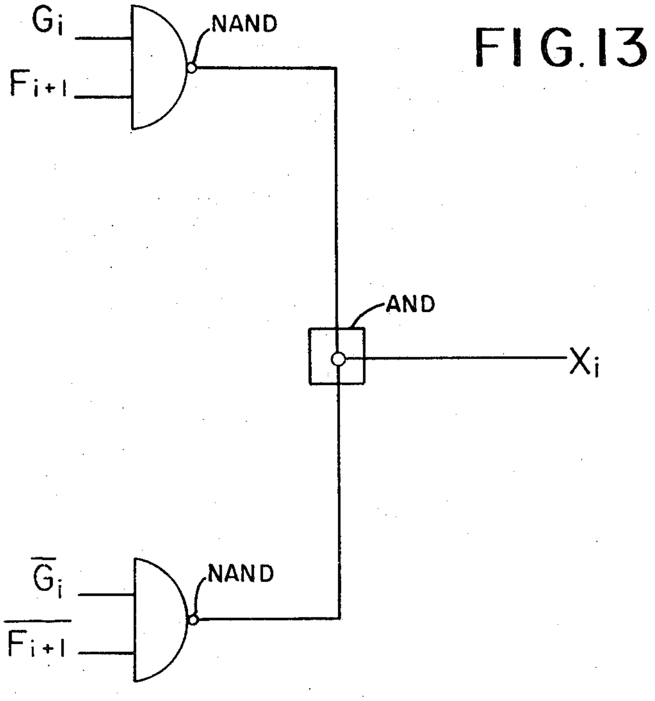

FIG. 5 shows the Wired-AND circuit employed for producing the logical operations (i.e., sum and carry) of equations (9);

FIG. 7 shows the Wired-AND circuits employed for producing the logical operations of equations (10) to form $D_j$ and $T_j$;

FIG. 8 shows the logic circuits employed for generating $E_e$ and $U_e$ in accordance with equations (11);

FIG. 9 shows the logic circuits employed to generate $\overline{E_1}'-\overline{E_4}'$ in accordance with equations (12);

FIG. 10 shows the logic circuits employed for generating $E''_{4(n1)+1}$ and $E''_{4(n-1)+2}$ in accordance with equations (13), the circuits for terms $E''_{4(n-1)+3}$ and $E''_{4(n-1)+4}$ having been omitted for purposes of simplicity;

FIG. 11 shows the logic circuits employed for $Q_{4(q-1)+2}$ and $G_{4(q-1)+1}$ in accordance with equations (14) and (15) the remaining terms of equations (14) and (15) having been omitted for purposes of simplicity;

FIG. 12 shows the logic circuits employed for generating $F_{4(r-2)+2}$ in accordance with equations (16), the remaining terms of equations 16 having been omitted for purposes of simplicity; and FIG. 13 shows the logic circuits employed for generating $X_o$ and $X_i$ in accordance with equations (17).

As is evident from the explanation set forth above, the novel method of the instant invention requires only seven logical levels in order to obtain the final sum $X_i$ which is smaller in the number of logical levels than any method presently in use, thereby making it possible to obtain very high-speed addition in a parallel circuit. Even assuming the NAND-AND or the AND-OR-NOT functional circuits were to be applied in the conventional circuit shown in FIG. 3, the arrangement would still nevertheless require two levels for obtaining both the true value and the complement of $E'''_i$ from the value $E''_i$, thus necessitating the total of eight levels.

As can be seen from the foregoing description, the instant invention enables the number of logical levels of a parallel-type adder circuit to be significantly reduced, and further provides an adder circuit in which the number of elements employed is relatively small so as to yield a highly effective adder circuit. In order to determine the operational time of an adder circuit, strictly speaking, not only the number of logical levels but also the magnitude of the load, the length of the wiring, etc., must be taken into account, yielding the result that the time lag of the NAND circuits which are Wired ANDs at their output side is not necessarily equal to the NAND circuits which are not Wired AND at their output side. However in general, since an apparent load due to a Wired AND connection is negligible compared with one that is not, it may be assumed that the time lag does not vary as a practical matter.

Whereas one preferred embodiment of the instant invention described herein was set forth for the case in which the 64-digits were divided into groups consisting of 4-digits each, it should be obvious that the instant invention is applicable for addition of an arbitrary number of digits of a greater or lesser number than 64, and further that any other grouping greater or lesser than 4-digits per groups may be employed.

Although the CML circuit has been described herein as the circuit element employed in the construction of the adder circuit, it should further be understood that the instant invention may employ any other circuits which yield the logical outputs of AND (OR) and NAND (NOR) simultaneously, and also the logical functions of NAND-AND (NOR-OR).

As will further be obvious from the explanation set forth above, identical circuits are not necessarily required for elements which simultaneously yield the logical functions of AND (OR) and NAND (NOR) and for elements yielding the logical function of NAND-AND (NOR-OR), and should be understood that a combination of two different types of circuits may be applied in the instant invention to yield these functions without in any way hindering the reliable high-speed operation desired.

Although the instant invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

I claim:

1. A high-speed parallel-type adder circuit for adding two multibit binary numbers comprising:

a plurality of first half-adder circuit means associated with each digit position for adding binary inputs associated with each digit position to generate an initial position sum and an initial position carry signal;

a plurality of second circuit means each being coupled to different groups of said first half-adder circuits for generating a group carry and group sum signal;

a plurality of third circuit means coupled to associated second circuit means for generating a real group carry signal;

a plurality of fourth circuit means each coupled to an associated half-adder circuit means and an associated one of sad third circuit means for generating an intergroup position carry signal from the adjacent lower order group;

a plurality of fifth circuit means each coupled to said half-adder circuits associated with a different group of said digit positions for generating an intragroup carry signal;

a plurality of sixth circuit means each coupled to an associated one of said fifth circuit means and an associated one of said half-adder circuits for generating a modified position sum signal; and a plurality of seventh circuit means each coupled to an associated one of said sixth circuit means and an associated one of said fourth circuit means for generating a final position sum signal.

2. The high-speed parallel-type adder circuit for adding two multibit binary numbers as claimed in claim 1 further comprising:

a a plurality of eighth circuit means each coupled to an associated one of said second circuit means for generating a supergroup carry signal and a supergroup sum signal; and a plurality of ninth circuit means each coupled between associated ones of said eighth circuit means and said third circuit means for generating a real supergroup carry signal employed by said third circuit means to generate said real group carry signal.

3. A high-speed parallel-type adder circuit for adding two multibit binary numbers comprising:

a plurality of first half-adder circuit means associated with each digit position for adding binary inputs associated with each digit position to generate an initial position sum and initial position carry signal;

a plurality of second circuit means each being coupled to different groups of said first half-adder circuit means for generating a complementary group carry signal and a true group sum signal;

a plurality of third circuit means each coupled to said second circuit means for generating a true supergroup carry and a true supergroup sum signal;

a plurality of fourth circuit means each coupled to said third circuit means for generating a real supergroup carry signal which is to be a complementary signal as against the true signals produced by the said third circuit means;

a plurality of fifth circuit means each coupled to both of said second circuit and said fourth circuit mans for generating a real group carry signal which is a true signal as against the complementary signals produced respectively by said fourth circuit means and said second circuit means;

a plurality of sixth circuit means each coupled to selected ones of both of said first half-adder circuit means and said fifth circuit means for generating an intergroup position carry signal from the adjacent lower order group;

a plurality of seventh circuit means each coupled to selected ones of said first half-adder circuit means associated with a different group of said digital positions for generating an intragroup carry signal;

a plurality of eighth circuit means each coupled to both of said seventh circuit means and said half-adder circuit means for generating a modified sum signal; and a plurality of ninth circuit means each coupled to both of said sixth circuit means and said eight circuit means for generating a final position sum signal.